United States Patent
Mitschelen et al.

[19]

[11] Patent Number: 6,042,145
[45] Date of Patent: Mar. 28, 2000

[54] ARRANGEMENT FOR ADJUSTING THE SITTING POSITION OF A VEHICLE OCCUPANT

[75] Inventors: Rolf Mitschelen, Kirchheim; Martin Steiner, Grafenau, both of Germany

[73] Assignee: DaimlerChrysler AG, Germany

[21] Appl. No.: 08/989,239

[22] Filed: Dec. 12, 1997

[30] Foreign Application Priority Data

Dec. 12, 1996 [DE] Germany .................. 196 51 670

[51] Int. Cl.⁷ .................................... B60R 21/32
[52] U.S. Cl. .............................. 280/735; 280/753
[58] Field of Search .................... 280/735, 751, 280/753; 297/216.12, 408, 216.1, 284.3, 391, 217.3

[56] References Cited

U.S. PATENT DOCUMENTS

| | | | |
|---|---|---|---|
| 4,645,233 | 2/1987 | Bruse et al. | 280/808 |
| 4,944,554 | 7/1990 | Gross et al. | 297/284 |
| 5,092,197 | 3/1992 | Hauger | 74/665 |
| 5,290,091 | 3/1994 | Dellanno et al. | 297/391 |
| 5,330,226 | 7/1994 | Gentry et al. | 280/735 |
| 5,694,320 | 12/1997 | Breed | 364/424.055 |
| 5,748,473 | 5/1998 | Breed et al. | 364/424.055 |

FOREIGN PATENT DOCUMENTS

| | | |
|---|---|---|
| 3427466C2 | 3/1985 | Germany . |
| 3739752A1 | 6/1989 | Germany . |
| 4228849C1 | 10/1993 | Germany . |

*Primary Examiner*—Lanna Mai
*Assistant Examiner*—Kevin McKinley
*Attorney, Agent, or Firm*—Evenson, McKeown, Edwards & Lenahan, P.L.L.C.

[57] ABSTRACT

An arrangement for adjusting the sitting position of a vehicle occupant has a sensor which determines the sitting height of the vehicle occupant sitting in the vehicle seat and measures in a no-contact manner, a control unit connected with the sensor, and an adjusting motor for the headrest which is connected with the control unit. For reducing the adjusting efforts required of the vehicle occupant when the seat is used and simultaneously ensuring a precise support of the cervical spine by the headrest which is individually adapted to the vehicle occupant, another adjusting motor for a vertical adjustment of the seat cushion relative to the backrest is provided which is also controlled by the control unit. The sensor scans the contour of the vehicle occupant's cervical spine and a computer integrated in the control unit computes from the scanning signals of the sensor the required height position of the headrest. A control logic integrated in the control unit first causes a controlling of the seat cushion adjusting motor and then a controlling of the headrest adjusting motor.

22 Claims, 2 Drawing Sheets

6,042,145

ARRANGEMENT FOR ADJUSTING THE SITTING POSITION OF A VEHICLE OCCUPANT

BACKGROUND AND SUMMARY OF THE INVENTION

This application claims the priority of German application 196 51 670.6-14 filed in Germany on Dec. 12, 1996, the disclosure of which is expressly incorporated by reference herein.

The invention relates to an arrangement for adjusting the sitting position of a vehicle occupant relative to the seat, which has a seat part with a seat cushion, a backrest which is swivellably held on the back seat part and a headrest.

In the case of vehicle seats, it is known to provide a plurality of adjusting possibilities so that the vehicle occupant sitting down in the vehicle seat can assume any sitting position she or he desires. These possibilities include longitudinally displacing the vehicle seat, adjusting the height of the seat cushion, adjusting the angle of slope of the backrest with respect to the seat cushion, and adjusting the height of the headrest. In most cases, these adjustments can be carried out manually by the vehicle occupant using corresponding handwheels, or by using hand levers that are operated utilizing corresponding servo motors operated by hand switches.

For minimizing the danger of injury to the vehicle occupant, it is necessary in the case of certain seat components to prevent the vehicle occupant from carrying out the adjustment and implementing the adjustment automatically. This applies particularly to the adjustment of the headrest since only its precise adjustment ensures satisfactory support of the head in an accident, thus providing sufficient protection.

In the case of a known arrangement for automatically adjusting vehicle seat components (German Patent Document DE 34 27 466 C2), a sensor provided which senses the sitting height of the vehicle occupant placed in the vehicle seat by determining the occupant's head position or shoulder position. Corresponding to the measuring result, a control device causes an adjustment of the headrest and the belt deflection mounting of the seat belt fastened to the vehicle body to the height positions required for the sitting height. The adjustment of the headrest and the belt deflection mounting takes place by means of electric motors for the purpose of adjusting the headrest and the belt deflection. The headrest is vertically slidably held on the backrest and the deflection mounting is vertically slidably held on the B-column of the vehicle body.

In a first embodiment of the sensor, the sensor consists of a light transmitter arranged in the occupant compartment, where a reflecting surface fastened in the upper area of the front side of the headrest and a light receiver which is arranged in front of the vehicle occupant in the occupant compartment senses the light reflected by the reflection surface. The light transmitter and the light receiver are preferably housed in a common housing.

In an alternative embodiment of the invention, the sensor consists of an ultrasonic distance meter, which is arranged above the usual head position or shoulder position of the sitting vehicle occupant and which measures the distance to the head or to the shoulder of the vehicle occupant.

Studies have shown that, in the case of a rear impact onto the vehicle or when the head is jerked back after the vehicle sustains a frontal impact, the headrests offer the best protection for the vehicle occupants if, in particular, the cervical spine is sufficiently supported. It was attempted to achieve this by means of headrests, where in this case the head cushion is swivellable about an axis of rotation situated on top.

However, the effect is only optimal if the head cushion rests completely against the cervical spine. For the purpose of ensuring this, the head cushion rests completely against the cervical spine, and the height of the headrest must be adjusted in a precise manner. An increase in comfort is achieved by means of so-called active headrests, where in the event of a rear impact, the head cushion is automatically swivelled onto the cervical spine so that the head cushion does not constantly rest against the cervical spine. In addition, for such an active headrest to offer a full protection, it is required that the headrest is precisely adjusted relative to the vehicle occupant. This is to guard against, in the case of an incorrect adjustment, the effect of the fast swivelling operation of the head cushion that may create additional stress to the vehicle occupant.

In such cases, the above-described known arrangement for adjusting the headrest will not lead to an adjustment of the height which is precise enough for the individual application. This is because the top edge of the head or the shoulder edge, which is sensed by the sensor as a characteristic of the seating height of the vehicle occupant, cannot provide information concerning the precise position of the neck lordosis contour of a seated person.

It is an object of the invention to improve an arrangement for adjusting the sitting position of a vehicle occupant of the initially mentioned type, where a seat adjustment which is individually adapted to the sitting height of the vehicle occupant is possible with minimal effort required from the vehicle occupant. It is another objective of the invention to improve an arrangement for adjusting the sitting position of a vehicle occupant where, during each seat adjustment, a precise support of the cervical spine of the vehicle occupant which is individually adapted to the vehicle occupant is automatically ensured in an accident.

These objects are achieved according to preferred embodiments of the invention by providing an apparatus for adjusting the seating position of a vehicle occupant relative to the seat components of a vehicle seat, having: a seat part with a seat cushion, the seat cushion being adjustable to two extreme positions; a backrest swivellably connected to the seat part; a headrest connected to the backrest that can be adjusted in its height position relative to the seat cushion, the headrest further having a sensor which determines the sitting height of the vehicle occupant seated on the seat cushion, wherein the sensor measures the sitting height in a no-contact manner; a control unit connected with the sensor and having a headrest adjusting motor for the headrest, the headrest adjusting motor being connected to the control unit, a seat cushion adjusting motor for vertical adjustment of the seat cushion connected to the control unit, a computer for computing the required height position of the headrest using scanning signals generated by the sensor; and a control logic unit for adjusting the computed height position of the headrest, the control logic unit first causing a controlling of the seat cushion adjusting motor and then a controlling of the headrest adjusting motor; wherein the sensor scans the cervical spine of the vehicle occupant in order to determine the seating position of the vehicle occupant.

The arrangement according to the invention has the advantage in that the seat height adapted to the sitting height of the vehicle occupant is first adjusted automatically and then the headrest adjusted to an optimal height position relative to the seat height. From this optimal height adjustment due to the precise assignment of the head cushion to the individual contour of the neck lordosis of each vehicle occupant, maximum protection is ensured in the event of an accident. The motor vehicle seat equipped with the arrangement according to the invention requires reduced adjusting efforts from the vehicle occupant because the individual distance to the steering wheel and pedals is adapted only by longitudinal displacement of the seat and the slope adjustment of the backrest. This can be carried out manually and with relatively few if any problems.

According to a preferred embodiment of the invention, the seat cushion adjusting motor can be switched on and off manually. The control unit is constructed such that, after each manual switching-off of the seat cushion adjusting motor, the headrest adjusting motor is controlled by the control unit for readjusting the height of the headrest. By means of these constructive measures, an additional possibility is provided to the vehicle occupant for readjusting the seat height, and it is simultaneously ensured that an appropriate adjustment of the height position of the headrest occurs in the event of an accident.

In the case of a vehicle seat which is equipped with a restraining system activatable in the event of a crash, parts of the arrangement according to the invention are utilized for activating the restraining system. For this purpose, the control unit is activated in the event of a crash and, in turn, activates the sensor. Upon activation of the sensor, the computer determines from the measuring signals supplied by the sensor the and from the actual values of actual-value generators, which sense the longitudinal displacement position and the backrest slope of the vehicle seat, computes the distance of the vehicle occupant from the steering wheel or the dashboard. The control logic will then activate the restraining system according to specific requirements. That is, corresponding to the distance of the vehicle occupant from the air bag systems in the steering wheel and in the dashboard determined by the arrangement.

Other objects, advantages and novel features of the present invention will become apparent from the following detailed description of the invention when considered in conjunction with the accompanying drawings.

DETAILED DESCRIPTION OF THE INVENTION

Figure 1:
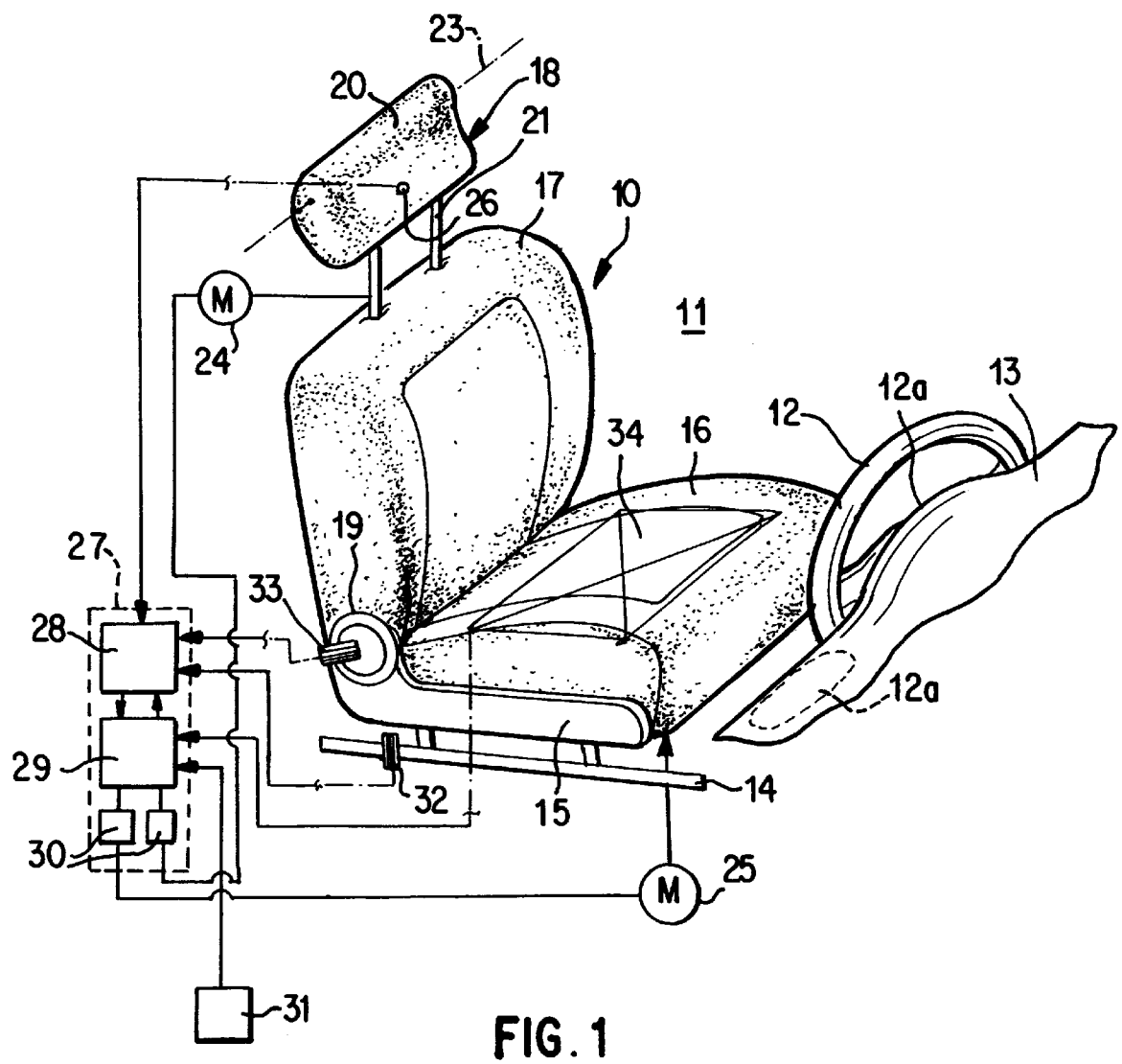
FIG. 1 is a schematic representation of a vehicle seat with an arrangement for adjusting the seat position of a vehicle occupant seated in the vehicle seat, constructed according to a preferred embodiment of the invention.

The vehicle seat 10, which is illustrated perspectively in FIG. 1, is arranged in the occupant compartment 11 in an assignment to a steering wheel 12 and a dashboard 13. The vehicle seat 10 is held displaceably in the longitudinal direction of the vehicle in longitudinal rails 14 on the floor of the occupant compartment 11 and can be fixed in the longitudinal rails 14 in any displacement position. In a known manner, the vehicle seat 10 consists of a seat part 15 with a seat cushion 16 and a backrest 17 which is swivellably held on the seat part 15 and has a headrest 18. The seat cushion 16 can be displaced in the seat part 15, relative to it, in the vertical direction and can be adjusted in its height position with respect to the vehicle body floor by means of a seat cushion adjusting motor that is schematically indicated by means of reference number 25. Regarding the seat part 15, the slope of the backrest 17 can be adjusted in its slope with respect to the seat surface of the seat cushion 16 by means of an adjusting device 19 (handwheel or electric motor) about a transversely extending swivelling axis. The headrest 18 has a head cushion 20 and a carrying bow 21 which holds the head cushion 20 and which is displaceably accommodated by means of its two carrying rods in guides in the backrest 17 which are not shown here. Preferably, the head cushion 20 is held on the carrying bow 21 about a swivelling axis situated on top and indicated by a dash-dotted line so that, in the case of a contact pressure, the head cushion 20 can be placed in a largely precise fitting manner against the head of the vehicle occupant sitting in the vehicle seat 10. The displacement of the carrying rods of the carrying bow 21, in the guides within the backrest 17 takes place by means of a schematically indicated headrest adjusting motor 24. With the deactivation of the headrest adjusting motor 24, the headrest 18 is locked in any adjusted position against a vertical adjustment.

Figure 2:
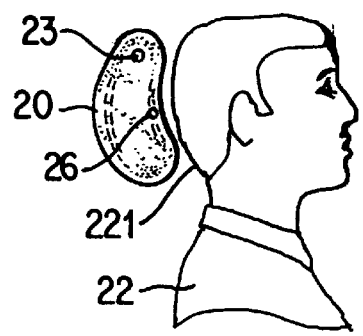
FIG. 2 is a schematic lateral cutout view of a vehicle occupant and a headrest of the arrangement of FIG. 1.

The vehicle seat 10 is equipped with an arrangement for adjusting the sitting position of a vehicle occupant 22 sitting down in a vehicle seat 10, which, for explaining the head support, is illustrated schematically in FIG. 2 as a cutout. The arrangement comprises a sensor 26 arranged in the head cushion 20 of the headrest 18 for the no-contact scanning of the contour of the cervical spine 221 of the vehicle occupant 22 (FIG. 2) and a control unit 27 for controlling the two adjusting motors 24 and 25 corresponding to the measuring values of the sensor 26. The control unit 27 comprises a computer 28 and a control logic 29 unit whose outputs are connected by way of power amplifiers 30 with one of the adjusting motors 24, 25 respectively. The input of the computer 28 is connected with the output of the sensor 26. The sensor 26, which operates in a no-contact manner, works on an ultrasonic or infrared basis. Such sensors 26 are offered, for example, by the firms Microsonic, Siemens, Delphi or Temic. As soon as the vehicle occupant 22 sits sat down in the vehicle seat 10, the sensor 26 senses the course of the vehicle occupant's 22 cervical spine 221 and supplies the measuring results as measuring signals to the computer 28. From the measuring signals, the computer 28 then computes the required height position of the headrest 18 and, for the purpose of adjusting the height position of the headrest 18, the computer supplies corresponding signals to the control logic unit 29. Such computing and adjusting of the required height position can, for example, take place in that a neck lordosis contour is stored in the computer 28 and then compared with the contour of the vehicle occupant's 22 spine 221 (scanned by the sensor 26) to generate error signals that are supplied to the control logic unit 29 until both contours correspond to one another as the result of the headrest height correction.

Another possibility consists of the comparison of the point of the neck lordosis, which is the farthest away from the sensor 26 or of the reversal point of the neck lordosis contour with a stored fixed point. The error signals supplied to the control logic 29 first cause a controlling of the seat cushion adjusting motor 25, which is rotated in a direction subsequently leading to a reduction of errors signals. The adjusting motor 25 moves the seat cushion 16 in the seat part 15 up or down corresponding to the appropriate error signals. When the seat cushion 16 has reached its extreme end position, the further presence of the error signals at the control logic 19 has the result that now the headrest adjusting motor 24 will now be controlled. This in turn will displace the headrest 18 to the backrest 17 until the error signals equal zero.

Correspondingly, when a vehicle occupant sits down in the vehicle seat 10, the following sequence will take place:

After the vehicle occupant sits down, the sensor 26 scans the vehicle occupant's 22 cervical spine 221, and the computer 28 determines, for example, that the head of the vehicle occupant 22 has a position which is too high relative to the head cushion 20. By means of corresponding error signals, the control logic 29 will first control the adjusting motor 25 for the seat cushion 16. The seat cushion 16 is moved downward. When the deepest cushion position has been reached and the sensor 26 still determines deviations of the ideal position of the head with respect to the head cushion 20, in a second step, the headrest 18 is adjusted relative to the backrest by means of the headrest adjusting motor 24. The same sequence takes place when a small vehicle occupant sits down, in which case the seat cushion 16 is first moved up into the maximum end position, where the headrest 18 is then displaced relative to the backrest 17. The activation of the arrangement takes place by means of an alarm circuit which is integrated in the control logic unit 29, which senses the seat occupancy by a vehicle occupant and generates a corresponding alarm signal. At this movement the computer 28 and the sensor 26 are activated. The seat occupancy can be recognized, for example, by means of a known pressure foil 34.

For reducing the control adjusting time, it is advantageous to provide a basic adjustment of the headrest, which takes place automatically as a function of the longitudinal seat adjustment, e.g., by the control from a characteristic curve diagram. The basic adjustment is completed before the seat is occupied; for example, when the pressure foil senses an unoccupied seat. Experiences have shown that seat users, particularly drivers of different heights, adjust the seat such that the eyes have a similar visual line. When a basic adjustment of the height of the headrest as a function of the longitudinal seat adjustment has already taken place, the automatic adjustment of the seat position will, in most cases, be limited only to the adjustment of the seat height that reduces the time until the seat is adjusted in an optimal manner.

As also illustrated here, the seat cushion adjusting motor 25, used for correcting the seat height, can be switched on and off manually. In this case, the control unit 27 is equipped with an additional function which, after each manual deactivation of the seat cushion adjusting motor 25, activates the computer 28 and the sensor 26 and carries out a new computation of the headrest position. The computing operation takes place in the same manner as described above. This ensures that the headrest has returned to the height position which is optimal with respect to safety.

If the vehicle seat 10 is equipped with a restraining system, such as a safety belt, an air bag or the like, which is activated in the event of a crash, the control unit 27 can also be used for activating the restraining system as required. In a crash, which is sensed by an acceleration sensor 31, for example, the computer 28 and the sensor 26 are activated. From the scanning signals of the sensor 26, the computer 28 computes the distance of the vehicle occupant 22 from the head cushion 20 and, from it and from actual values of the actual-value generators 32 and 33, determines the distance of the vehicle occupant from the air bag system 12a in the steering wheel 12 or in the dashboard 13. The computer 28 supplies corresponding control signals to the control logic unit 29 which, as required, activates the restraining system corresponding to the computed distance. The two actual-value sensors 32 and 33, on the one hand, sense the longitudinal displacement position of the vehicle seat 10 in the longitudinal rails 14 and thus the actual distance of the vehicle seat 10 from the dashboard 13. On the other hand, the two actual-value sensors 32 and 33 sense the angle of slope of the backrest 17 relative to the seat surface of the seat cushion 16.

The vehicle seat 10 illustrated in FIG. 1 may be a driver seat or a front passenger seat. In the known manner, an air bag system integrated in the steering wheel 12 is assigned to the driver seat and an air bag system 12a integrated in the dashboard 13 is assigned to the front passenger seat and a seat belt is assigned to each seat.

Figure 3:
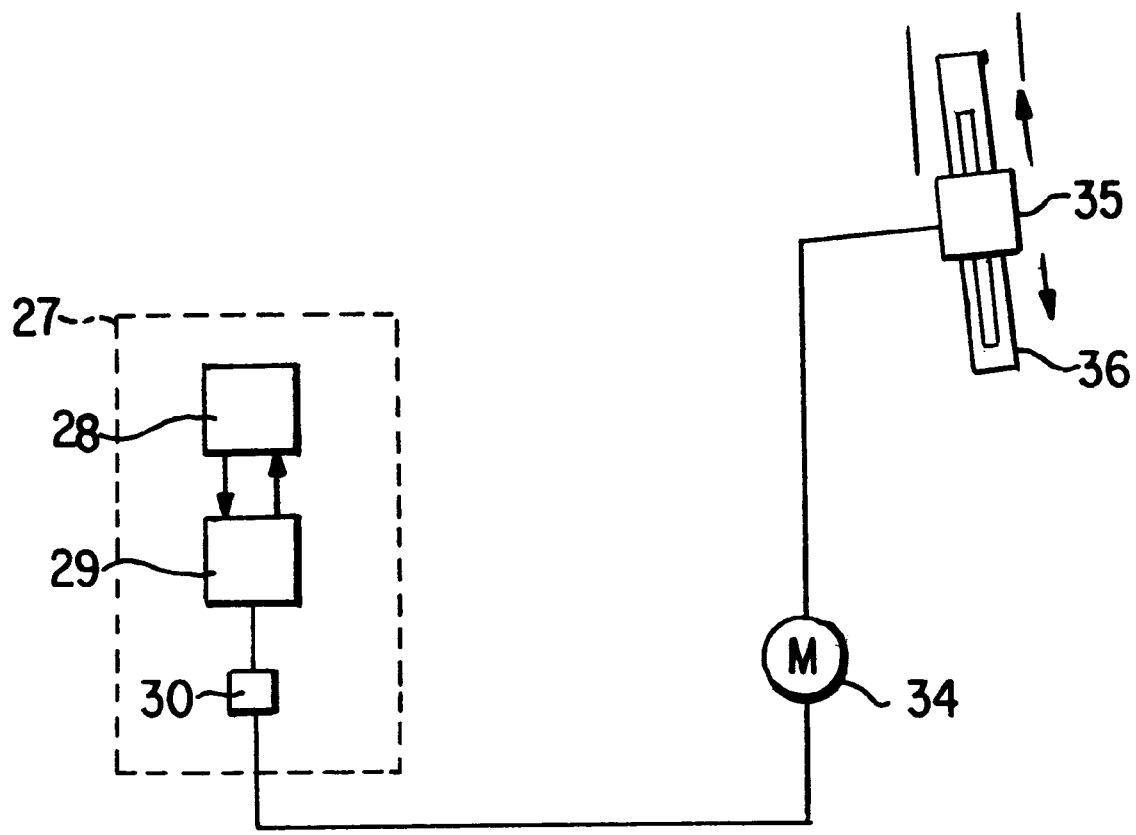
FIG. 3 is a schematic representation of the arrangement for automatically adjusting the seat belt of the vehicle occupant.

The invention is not limited to the above described embodiment. For example, in addition, the adjusting device can be expanded in that a precise location of the neck lordosis is obtained by scanning from the neck lordosis of a seated person to his shoulder height. The height of a belt deflection mounting 35 for the seat belt 36 which is adjustably held to the vehicle body 37 is adjusted by a motor 34 (FIG. 3). This adjustment is with respect to the vehicle occupant's shoulder and is thus adapted to the vehicle occupant's height.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An apparatus for adjusting the seating position of a vehicle occupant relative to the seat components of a vehicle seat, having:

a seat part with a seat cushion, a height of the seat cushion relative to the seat part being adjustable between two extreme positions;

a backrest swivellably connected to the seat part;

a headrest connected to the backrest, which headrest can be adjusted in its height position relative to the seat part, the headrest further having a sensor which determines sitting height of a vehicle occupant seated on the seat cushion, in a no-contact manner;

a control unit connected with the sensor and having a computer for computing a required height position of the headrest relative to the seat cushion using scanning signals generated by the sensor, and a control logic unit for adjusting the seat components to a computed required height position of the headrest;

a headrest adjusting motor connected to the control unit, for adjusting the height of the headrest relative to the backrest; and a seat cushion adjusting motor for vertical adjustment of the seat cushion, connected to the control unit; wherein, the control logic unit controls the headrest and seat cushion adjusting motors to adjust a height of the headrest relative to the seat cushion, first by adjusting the seat cushion adjusting motor and then by adjusting of the headrest adjusting motor; and the sensor scans the cervical spine of the vehicle occupant in order to determine the seating position of the vehicle occupant.

2. An apparatus according to claim 1,
wherein the controlling of the headrest adjusting motor occurs only after one of the two extreme positions of the seat cushion is reached.

3. An apparatus according to claim 2,
wherein for correcting the seat height, the seat cushion adjusting motor can be manually switched on or off, and after each manual activation of the seat cushion adjusting motor the control unit controls the headrest adjusting motor to readjust the headrest height.

4. An apparatus according to claims 1,
wherein for correcting the seat height, the seat cushion adjusting motor can be manually switched on or off, and after each manual activation of the seat cushion adjusting motor the control unit controls the headrest adjusting motor to readjust the headrest height.

5. An apparatus according to claim 1,
wherein the sensor is centrally located in a head cushion of the headrest used for direct contact with the head of the vehicle occupant.

6. An apparatus according to claim 1, the apparatus further having an air bag located in a steering wheel or the dashboard, wherein:
based on measuring signals supplied by the sensor activated in a crash the computer determines the distance of the vehicle occupant from the headrest;
from actual values obtained from a plurality of actual-value generators for sensing longitudinal displacement position and backrest slope of the vehicle seat, the computer computes a distance of the vehicle occupant from the air bag;
the control logic unit then activates the restraining system corresponding to the computed distance of the vehicle system occupant from the air bag or dashboard.

7. An apparatus according to claim 1, wherein, upon sensing a frontal crash, an alarm circuit activates the sensor and the control unit.

8. An apparatus according to claim 1,
wherein when the vehicle seat is unoccupied the control unit controls the headrest adjusting motor for adjusting a basic height adjustment of the headrest as a function of the longitudinal seat adjustment.

9. An apparatus according to claim 8,
wherein the control unit stores a characteristic curve that defines the relationship between the longitudinal seat adjustment and the basic height adjustment of the headrest.

10. An apparatus according to claim 1,
wherein the control unit controls an adjusting motor for a deflection mounting for a seat belt held vertically displaceably on the vehicle body, the deflection mounting located about the vehicle occupant's shoulder and being automatically adapted to the vehicle occupant's height.

11. A method of automatically adjusting the seating position of a vehicle occupant relative to seat components of a vehicle seat, comprising the steps of:
determining with a sensor located in a headrest a precise position of a neck lordosis contour of a vehicle occupant seated in a seat cushion in order to determine a seating position of the vehicle occupant;
determining with the sensor an exact seating height of the vehicle occupant;
computing with a computer a required height position of the headrest using scanning signals generated by the sensor; and
adjusting the seat components to achieve the computed required height position of the headrest with a control logic unit, first by controlling a seat cushion adjusting motor to adjust a vertical height of the seat cushion without movement of the headrest, and then by controlling a headrest adjusting motor to adjust a vertical height of the headrest.

12. A method according to claim 11, further comprising the step of:
controlling the headrest adjusting motor only after one of two extreme positions of the seat cushion is reached.

13. A method according to claim 12, comprising the further step of adjusting the headrest height with the control unit after each manual activation of the seat cushion adjusting motor;
wherein for correcting the seat height, the seat cushion adjusting motor can be manually switched on or off.

14. A method according to claim 11, further comprising the step of:
adjusting the headrest height with the control unit after each manual activation of the seat cushion adjusting motor;
wherein for correcting the seat height, the seat cushion adjusting motor can be manually switched on or off.

15. A method according to claim 11, comprising the further step of sensing the seat occupancy with an alarm circuit to activate the sensor and the control unit.

16. A method according to claim 11, comprising the further steps of:
monitoring with the sensor an air bag;
measuring signals supplied by the sensor activated in a crash;
determining with the computer the distance of the vehicle occupant from the headrest;
obtaining actual values from a plurality of actual-value generators for sensing the longitudinal displacement position and the backrest slope of the vehicle seat;
computing a distance of the vehicle occupant from the air bag located in a steering wheel or a dashboard;
activating an air bag corresponding to the computed distance with the control logic unit.

17. A method according to claim 11, further comprising the step of:
activating the sensor and the control unit with an alarm circuit upon sensing a frontal crash.

18. A method according to claim 11, further comprising the step of:
controlling the headrest adjusting motor with the control unit to adjust a basic height adjustment of the headrest as a function of the longitudinal seat adjustment when the vehicle seat is unoccupied.

19. A method according to claim 11, further comprising the step of:
storing in the control unit a characteristic curve that defines the relationship between the longitudinal seat adjustment and the basic height adjustment of the headrest.

20. An apparatus for automatically adjusting the seating position of a vehicle occupant relative to seat components of a vehicle seat, comprising:
a sensor located in a headrest for determining a precise position of the neck lordosis contour of a vehicle occupant seated in a seat cushion in order to determine a seating position of a vehicle occupant, and an exact seating height of the seated vehicle occupant;

a computer for computing a required height position of the headrest using scanning signals generated by the sensor; and a control logic unit for adjusting the seat components to achieve the computed required height position of the headrest, first by controlling a seat cushion adjusting motor to adjust a vertical height of the seat cushion without movement of the headrest, and then by controlling a headrest adjusting motor to adjust a vertical height of the headrest.

21. An apparatus for adjusting the seating position of a vehicle occupant relative to the seat components of a vehicle seat, comprising:

a seat part which is mountable on a floor of a vehicle;

a seat cushion supported on said seat part, a height of the seat cushion relative to the seat part being adjustable between upper and lower limits;

a backrest swivellably connected to the seat part;

a headrest supported on the backrest, a height of the headrest relative to the backrest being adjustable;

a control unit for adjusting a spatial relationship between the seating position of the vehicle occupant and the headrest, first by adjusting the height of the seat cushion relative to the seat part, and then by adjusting the height of the headrest relative to the backrest.

22. A method of adjusting the seat components of a vehicle seat relative to the seating position of a vehicle occupant, comprising:

first, adjusting the height of a seat cushion of the vehicle seat, without changing the height of a backrest of the vehicle seat;

second, adjusting the height of a headrest supported on the backrest of the vehicle seat, relative to the height of the backrest, to provide a desired position of the headrest relative to the vehicle occupant.

* * * * *